No. 779,516.

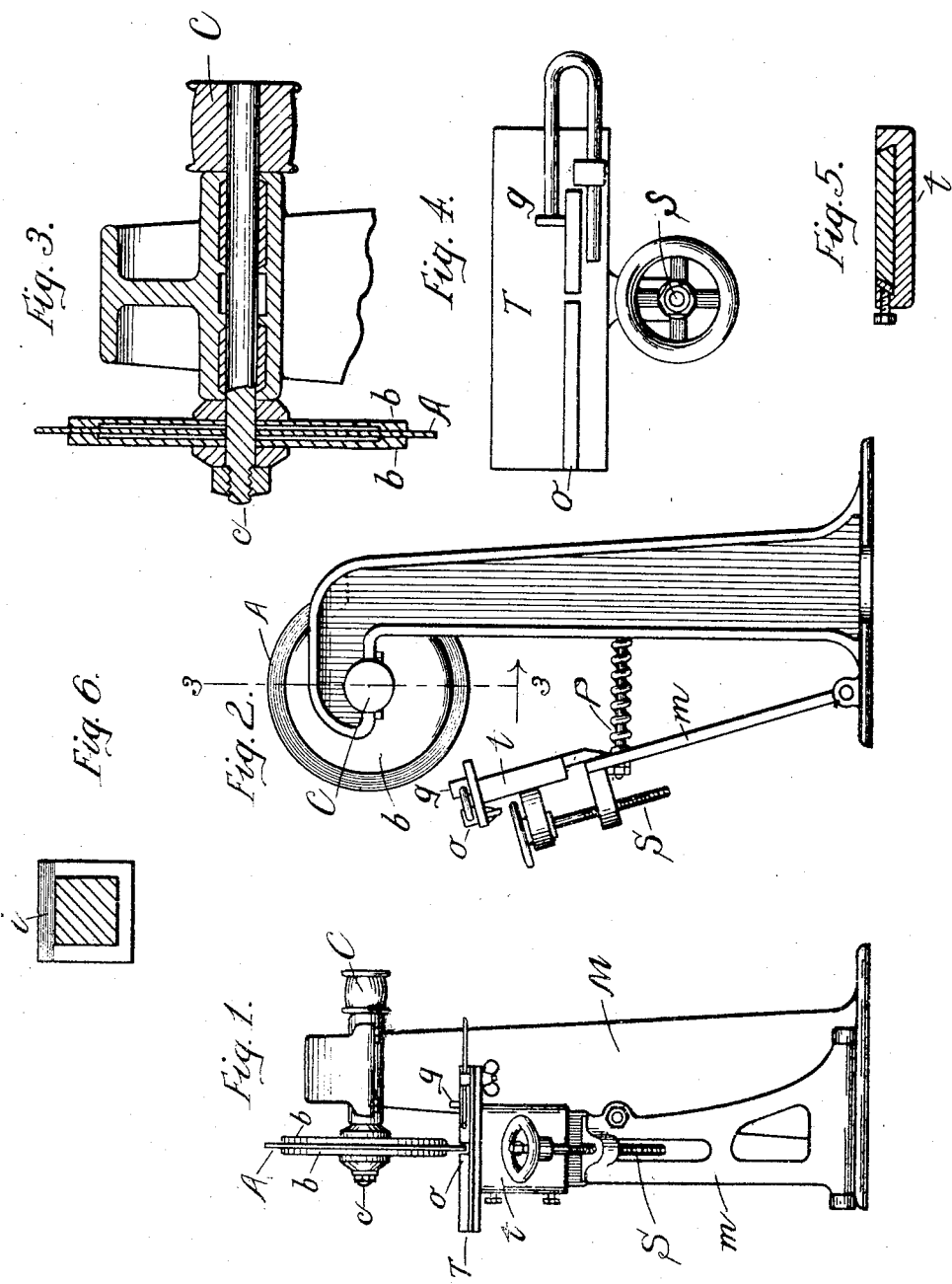

Patented January 10, 1905.

UNITED STATES PATENT OFFICE.

JOHN ARMSTRONG, OF CHICAGO, ILLINOIS, ASSIGNOR TO ARMSTRONG BROS. TOOL CO., A CORPORATION OF ILLINOIS.

PROCESS OF CUTTING SELF-HARDENING STEEL.

SPECIFICATION forming part of Letters Patent No. 779,516, dated January 10, 1905.

Application filed March 21, 1904. Serial No. 199,221.

*To all whom it may concern:*

Be it known that I, JOHN ARMSTRONG, a citizen of the United States, and a resident of Chicago, county of Cook, and State of Illinois, have invented certain new and useful Improvements in Processes of Cutting Self-Hardening Steel, of which the following is a specification, reference being had to the accompanying drawings, in which—

Figure 1 represents a front elevation, Fig. 2 a side elevation, and Figs. 3, 4, 5 details, of a machine for carrying out the process; and Fig. 6 is an end view of a bar of metal, showing the work of the machine.

The invention relates to the cutting of that metal known in the trade as "self" or "air" hardening steel and which is used for machine-tools. This steel is customarily supplied by the manufacturer in bars of a suitable section for tools, but of a length sufficient for a number of tools, and it is necessary for the consumer or the maker of tools to cut these bars into a number of short pieces. This self or air hardening steel is of such an extremely-hard nature that it is impossible to cut by any ordinary means, such as a hack-saw or toothed cutter of any description. It is also very expensive, and heretofore great waste of time and material have resulted from the lack of some quick and practical method of cutting off this character of steel in a cold condition. The common practice has been to heat the bar-steel in a forge and cut it with a chisel and sledge while hot or to cut it partly through with an emery-wheel and then break it. These methods, however, have resulted in loss both of time and material.

The present invention is designed to avoid this waste of time and material incident to the methods previously mentioned; and it has for its object to provide a process for cutting off bars or rods of this class of steel quickly and accurately while cold.

The process consists in cutting into the bar of steel by means of a rapidly-revolving disk of tool-steel having initially a smooth periphery. Preferably a shallow kerf is thus cut across each face of the bar, when it may be broken over an anvil, the fracture being confined to the plane of the kerfs.

In the accompanying drawings, A is a rotatable disk of tool-steel supported by the heavier disks $b\ b$ and rigidly fixed to the shaft $c$ by means of plates $d\ d$ and a nut $f$. The belt-pulley C provides means for rapidly rotating the shaft $c$ and the disk A. The frame M serves to support the rotating parts just described, as well as a work-table T capable of being moved to and fro under the disk. Projecting from the bottom of the work-table T is a slide $t$, which engages the upper portion of the upright $m$ and provides means for raising and lowering the table to accommodate different sizes of work, this adjustment being made by the screw S. The upright $m$ is pivoted to the frame M to provide for the oscillating movement of the work-table under the disk. An expansion-spring P returns the work-table to its normal position after each advance to the cutting-disk. The work-table is provided with a guide or stop $g$ to facilitate the adjustment of the bar or rod on the table in order that pieces of uniform length shall be cut off.

In carrying out this process the bar or rod to be cut is placed on the table and firmly held against the strip $o$ and the stop $g$, and the table is pushed forward and under the disk, whereby the incision (shown by Fig. 6) is made. After the return of the table to its normal position the bar or rod is turned over a part of a turn and the operation repeated, and so on until several incisions have been made around the bar. The depth of the incision can be varied by adjusting the height of the work-table.

The cutting-disk is made of tool-steel and is preferably about one thirty-second of an inch in thickness and eighteen inches in diameter. The saw is preferably slightly dished in order that a clearance will be provided. In practice the disk is rotated so as to have a peripheral speed of between two and three miles a minute. It has been found that the disk will not cut materially until its edge has been suitably prepared. This preparation consists in rotating the disk for some time with its edge in contact with self-hardening steel, the cutting quality of the blade gradually developing, the initial effect being a mere abrasion of the material. After being thus treated for one or two hours the blade will cut into the material readily. While I am not prepared to suggest the details of the theory of the operation, I suppose it to be a fact that the rim of the saw becomes charged with minute particles of the self or air hardening steel and that these particles constitute the saw-teeth or abrading agents.

During the operation of cutting, grains of self-hardening steel are thrown out by the disk, the "sawdust" remaining in the form of loose or separate grains, clearly indicating the sawing to be accomplished by a true cutting action as distinguished from the fusion set up by so-called "cold-sawing," as practiced heretofore.

I claim as my invention—

1. The method of cutting self or air hardening steel consisting in applying to it the rim of a rapidly-revolving disk of tool-steel which has been subjected to abrasive contact with self or air hardening steel.

2. The process of cutting self or air hardening steel, consisting in first treating the rim of a metal disk by impinging it while in rapid rotative movement against a mass of material having the character of self or air hardening steel, such treatment being continued for a considerable period of time, then applying the disk edge, while rotating at high speed, to the surface of the material to be cut and passing it into the body thereof.

JOHN ARMSTRONG.

Witnesses:
PAUL ARMSTRONG,
LOUIS K. GILLSON.